United States Patent Office 2,995,051
Patented Aug. 8, 1961

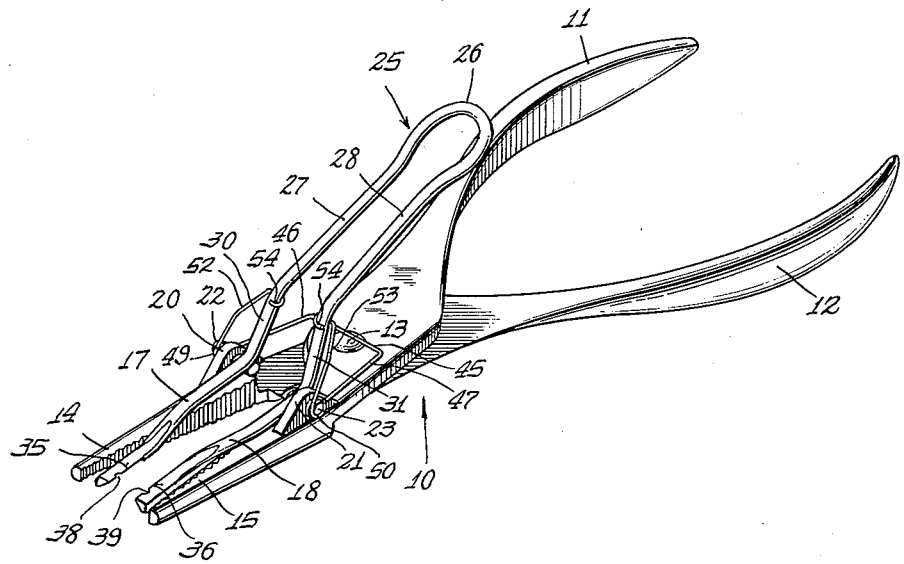

2,995,051
HAND-HELD WIRE STRIPPER
George F. Redway, 33 Noel Drive, Ossining, N.Y.
Filed Feb. 13, 1957, Ser. No. 639,994
8 Claims. (Cl. 81—9.5)

This invention relates to devices for stripping insulation from electrical wires, and more particularly to devices of this type which are intended to be hand-held.

An object of the invention is to provide a novel and improved hand-held wire stripper which is especially useful and efficacious in stripping wires of their insulation, in confined or hard to reach space.

Another object of the invention is to provide a novel and improved wire stripping device in accordance with the above, which may be actuated in its entirety, by one hand.

Yet another object of the invention is to provide an improved wire stripping device in accordance with the foregoing, which utilizes as an important part or components thereof current available pliers for which tools have already been developed, and are in existence.

In conjunction with the immediately preceding object, it is a further object of the invention to provide an improved wire stripping tool as above characterized, which requires but little modification of an existing pair of long-nose pliers to adapt them for use as a component of the device.

A feature of the invention resides in the provision of an improved hand-held wire stripping device as above set forth, which has relatively few parts of simple construction, and wherein the operations required of the user are an absolute minimum, in the present instance such operations being one in number, in addition to the closing or gripping actuation of the pair of pliers.

Yet another object of the invention is to provide an improved hand-held wire stripper having all of the above features and advantages and which is nevertheless constituted of relatively few parts, and is economical to fabricate and assemble.

Other features and advantages will hereinafter appear.

In the drawings accompanying this specification, similar characters of reference indicate corresponding parts wherever possible in the several views, in which:

FIG. 1 is a perspective view of the improved wire stripping device of this invention.

FIG. 2 is an end view of the jaws of the device in open condition and prior to engaging or gripping the wire.

FIG. 3 is a view similar to FIG. 2, but showing the jaws of the device engaging and gripping a wire prior to the stripping thereof.

FIG. 4 is a view similar to FIGS. 2 and 3, but showing the wire with the insulation stripped from it by actuation of the wire stripping device.

As shown, the improved hand-held wire stripping device of the present invention may comprise in part a conventional type of long nose pliers indicated generally by the numeral 10, said pliers having handles 11 and 12 connected together by a fulcrum 13, and having elongate slender tapered jaws 14 and 15 of the usual type.

In accordance with this invention I provide a second pair of jaws 17, 18 which are movably mounted respectively on the jaws 14, 15 and are movable simultaneously therewith when the pliers are operated, as by actuation of the handles 11 and 12.

In the embodiment of the invention illustrated herein, the jaws 17 and 18 are made elongate, and arranged to extend alongside of and closely spaced to the jaws 14, 15 of the pliers 10. Also, by the present invention the second pair of jaws 17, 18 is pivotally mounted on the jaws 14, 15 of the pliers adjacent the fulcrum 13 thereof. For this purpose, the jaws 14, 15 may be provided with up-standing apertured ears or pillow blocks 20, 21 in which are received pins 22, 23 rigidly affixed to the jaws 17, 18 as by welding or any other suitable procedure.

Further, in accordance with the invention I provide a means for manually operating or actuating the second or stripping pair of jaws 17, 18, such means in the present preferred embodiment of the invention comprising a U-shaped handle member 25 having a circular finger or thumb piece 26, and coextensive spaced leg portions 27 and 28 respectively joined to the stripping jaws 17, 18. Preferably, the portions 27, 28 also include angularly disposed offsets 30, 31 respectively, which offset portions then extend to the pivot pins 22, 23.

As shown, the jaws 17, 18 and the handle portion 25 of the stripping attachment may be advantageously constituted from a single piece of wire stock, and the pins 22, 23 may be secured to the said wire form by welding or in any other suitable manner.

Referring to FIGS. 2 through 4, the jaws 17, 18 are provided with flats 33 and 34 respectively, by which sharpened edges 35 and 36 are produced, said edges being adapted to cut into the wire insulation.

Also, for the purpose of preventing the stripping jaws 17, 18 from cutting through the actual wire itself, said jaws are provided with notches 38 and 39, as clearly shown in FIGS. 1 and 2, which notches are adapted to provided clearance for the wire conductor from which the insulation is to be stripped.

FIGS. 3 and 4 indicate an insulated wire 40 having as seen in FIG. 4 a central conductor 41, either solid or strained from which an end portion 42 of insulation is to be stripped.

There is also provided in accordance with this invention a novel spring means by which the stripping jaws 17, 18 are maintained adjacent or close to the jaws 14, 15 of the pliers (see FIGS. 1 and 3), such means also providing for disposition of the stripping jaws between the plier jaws when the pliers is in open position, as clearly indicated in FIG. 2.

Referring to FIG. 1, the said spring means comprises a wire form having a base portion 45 in the form of a yoke, having forwardly extending legs 46 and 47 joined to coils 49 and 50 which are disposed respectively on the pivot pins 22 and 23. From the coils 49 and 50 spring arms 52 and 53 extend, terminating in hooks 54 arranged to engage the angularly extended portions 30 and 31 of the handle means 25. The spring structure as thus constituted may be easily and quickly applied to the assembled pliers and stripper structure, by slipping coils 49 and 50 over the pivot pins 22 and 23, and thereafter engaging the hooks 54 with the handle portions 30, 31. Also, it will be noted that assembly of the stripping portion of the device to the pliers portion may be easily and quickly accomplished by merely introducing the pivot pins 22, 23 into the apertured ears 20, 21 from the inner sides thereof, while the pliers is in open condition.

Operation of the improved wire stripping device of this invention is as follows: The pliers are first opened, as by moving apart the handles 11 and 12, whereupon the stripping jaws 17 and 18 will spread apart to a degree slightly less than the jaws 14 and 15 of the pliers. Also, the stripping jaws 17 and 18 at their extremities will be disposed inside of the extremities of the plier jaws 14, 15, as indicated in FIGS. 1 and 2.

At this point it will be noted that such relative disposition of the jaws enables them to constitute a compact assemblage in spite of their being spread apart, inasmuch as the extremities of all four jaws are in alignment, and inasmuch as the jaws are very narrow at such extremities. Thus, by this organization the stripping tool may be brought into a confined or hard to reach space, for the stripping of insulation from wires located in such space, Upon the four jaws being separated as aforesaid, the wire which is to be stripped is placed in the space provided between the jaws, in registration with the notches 38 and 39, whereupon the handle portions 11 and 12 of the pliers are forced toward each other. This will result in the stripping jaws 17, 18 first engaging the wire (indicated at 40 in FIG. 3) and thereafter shifting laterally out of their positions between the jaws 14 and 15, the latter thereupon gripping the insulation of the wire 40. The stripping jaws 17 and 18 will meanwhile be made to cut into the insulation by virtue of strong force being exerted on them by the apertured ears 20, 21. This is clearly indicated in FIG. 3, and it will be understood that the wire form is so arranged, with the jaws 17 and 18, that closing of the jaws 14 and 15 of the pliers effect a strong insulation-cutting force. The handle 25 of the stripping mechanism is now depressed, as by the thumb of the hand holding the pliers, whereupon the stripping jaws 17, 18 will be shifted away from the clamping jaws 14, 15 as illustrated in FIG. 4 and such stripping jaws will carry with them the insulation 42, thereby stretching the same from the wire 41.

It will be readily understood from the foregoing that I have provided a novel and improved advantageous stripping device which may be utilized to reach inaccessible places for the purpose of stripping insulation from wire. The said device is adapted for one hand actuation, and utilizes as one of its main assemblies an ordinary longnose type pliers. Moreover, the entire device is of relatively simple components, easily fabricated, and the assembly of the components to each other may be easily and quickly effected. Accordingly, the stripping device of this invention may be manufactured very economically. Due to the simplicity of the components and the simple principles involved, operation is reliable and foolproof throughout an extended period of use.

Variations and modifications may be made within the scope of the claims and portions of the improvements may be used without others.

I claim:

1. A wire stripper comprising a pair of pliers including two handles each having one elongate jaw with a free tip, said jaws being disposed in one plane and connected to each other by a fulcrum and having relatively broad gripping surfaces adapted to engage and grip the insulation of an insulated wire without cutting through the same to the inner conductor; a pair of coextensive elongate arms connected with each other at one pair of manually engageable and operable corresponding ends and having at their other ends respectively a second pair of jaws; means disposed intermediate the ends of said arms, pivotally mounting said arms for swinging movement on the first pair of jaws, said pivotal mounting means including pairs of cooperable driving abutments disposed intermediate the ends of said arms and at points on the first-mentioned pair of jaws which are spaced an appreciable distance from the free tips therefrom, said abutments effecting simultaneous driving and closing of the second pair of jaws when the pliers are actuated, said second pair of jaws being located adjacent the first-mentioned pair and having sharp, notched cooperable edges adapted to engage and bite into the insulation of the wire, said arm ends being manually operable for moving the said second pair of jaws away from the first-mentioned pair of jaws when both said pairs of jaws are engaging the wire insulation, thereby to strip the latter from the wire.

2. The invention as defined in claim 1, in which the arms and the second jaws are of spring wire and are U-shaped.

3. The invention as defined in claim 2, in which the means pivotally mounting the arms on the first-mentioned pair of jaws are disposed at locations adjacent the fulcrum of the pliers.

4. The invention as defined in claim 3 in which the driving abutments include pillow blocks.

5. A wire stripper comprising a pair of pliers including two handles each having one jaw with a free tip, said jaws being disposed in one plane and connected to each other by a fulcrum and having relatively broad gripping surfaces adapted to engage and grip the insulation of an insulated wire without cutting through the same to the inner conductor; a pair of coextensive elongate arms connected with each other at one pair of manually engageable and operable corresponding ends disposed in spaced relation to the pliers and having at their other ends respectively a second pair of elongate jaws disposed alongside the first-mentioned pair of jaws, said arms and the second jaws being of spring-wire and having a U-shape; means disposed intermediate the ends of said arms at locations adjacent the fulcrum of the pliers, pivotally mounting said arms for swinging movement on the first-mentioned pair of jaws, said pivotal mounting means including pins and including driving means causing simultaneous movement of said second pair of jaws in response to actuation of said handles toward each other, said second pair of jaws having sharp, notched cooperable edges adapted to engage and bite into the insulation of the wire, said arm ends being manually operable, for moving the said second pair of jaws away from the first-mentioned pair of jaws when both said pairs of jaws are engaging the wire insulation, thereby to strip the latter from the wire; and spring means including coil springs carried by said pins, for yieldably holding the second pair of jaws in juxtaposition to the first-mentioned pair of jaws.

6. A wire stripper comprising a pair of pliers including two handles each having one elongate jaw with a free tip, said jaws being disposed in one plane and connected to each other by a fulcrum and having relatively broad gripping surfaces adapted to engage and grip the insulation of an insulated wire without cutting through the same to the inner conductor; a pair of coextensive elongate arms connected with each other at one pair of manually engageable and operable corresponding ends and having at their other ends respectively a second pair of elongate jaws disposed alongside the first-mentioned pair of jaws, said arms and the second jaws being of spring wire and having a U-shape; means disposed intermediate the ends of said arms at locations adjacent the fulcrum of the pliers pivotally mounting said arms for swinging movement on the first pair of jaws, said pivotal mounting means comprising apertured driving ears carried by the jaws of the pliers and pins rigid respectively with the jaws of the second pair and passing through said ears, said second pair of jaws moving simultaneously when the pliers are actuated, said second pair of jaws having sharp, cooperable edges adapted to engage and bite into the insulation of the wire, said arm ends being manually operable for moving the said second pair of jaws away from the first-mentioned pair of jaws when both said pairs of jaws are engaging the wire insulation, thereby to strip the latter from the wire.

7. The invention as defined in claim 1 in which there are spring means tending to hold the second pair of jaws juxtaposed to the first-mentioned jaws.

8. A wire stripper comprising a pair of pliers including two handles each having one elongate jaw with a free tip, said jaws being connected to each other by a fulcrum and being adapted to engage and grip the insulation of an insulated wire; a pair of coextensive elongate arms connected with each other at one pair of corresponding ends and having at their other ends respectively a second pair of jaws; means disposed intermediate the ends of said arms, pivotally mounting said arms on the first pair of jaws, said pivotal mounting means including pairs of cooperable abutments disposed intermediate the ends of said arms and at points on the first-mentioned pair of jaws which are spaced an appreciable distance from the free tips therefrom, said abutments effecting simultaneous closing of said second pair of jaws when the pliers are actuated, said second pair of jaws being located adjacent the first-mentioned pair and having sharp, notched cooperable edges adapted to engage and bite into the insulation of the wire, said arms having the said pair of corresponding ends thereof free of the pliers and said arm ends being manually operable, for moving the said second pair of jaws away from the first-mentioned pair of jaws when both said pairs of jaws are engaging the wire insulation, thereby to strip the latter from the wire, the said pair of pliers being of the long-nose type, having slender tapered jaws, and said second pair of jaws being elongate and extending alongside the said first-mentioned pair of jaws.

References Cited in the file of this patent

UNITED STATES PATENTS

| | | |
|---|---|---|
| 1,151,319 | Wood | Aug. 24, 1915 |
| 1,618,734 | Smitak | Feb. 22, 1927 |
| 1,857,731 | Lund | May 10, 1932 |
| 2,217,077 | Phillips | Oct. 8, 1940 |
| 2,601,797 | Holt | July 1, 1952 |

FOREIGN PATENTS

| | | |
|---|---|---|
| 780,257 | France | Jan. 29, 1935 |